(12) United States Patent
Chalmers et al.

(10) Patent No.: US 12,151,780 B2
(45) Date of Patent: Nov. 26, 2024

(54) SEAL STRUCTURES

(71) Applicant: Fox Factory, Inc., Duluth, GA (US)

(72) Inventors: Douglas Alexander Chalmers, North Vancouver (CA); Paul Klawer, North Vancouver (CA); Bjorn Borgers, Vancouver (CA); Evan Michael Choltco-Devlin, New Westminster (CA); Bart Scicchitano, Squamish (CA); Fraser Andrew, North Vancouver (CA); Aljonn Lacerna, North Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/851,055

(22) Filed: Jun. 28, 2022

(65) Prior Publication Data

US 2022/0411011 A1    Dec. 29, 2022

Related U.S. Application Data

(60) Provisional application No. 63/218,875, filed on Jul. 6, 2021, provisional application No. 63/215,771, filed on Jun. 28, 2021.

(51) Int. Cl.
*B62M 3/00* (2006.01)
*F16C 33/80* (2006.01)

(52) U.S. Cl.
CPC ........... *B62M 3/003* (2013.01); *F16C 33/805* (2013.01); *F16C 2326/28* (2013.01)

(58) Field of Classification Search
CPC ........ B62M 3/00; B62M 3/003; B62M 19/34; F16C 33/80; F16C 33/805; F16C 2326/28; B62K 19/34
See application file for complete search history.

(56) References Cited

U.S. PATENT DOCUMENTS 7,059,686 B2 *  6/2006  Kanehisa ............ B60B 27/0078
                                                301/110.5
8,246,064 B2 *  8/2012  Kuroiwa ................ B62M 3/003
                                                74/594.1

(Continued)

FOREIGN PATENT DOCUMENTS

DE    102016219602 A1 *  4/2018
WO    WO-2006029673 A1 *  3/2006  ......... B60B 27/0005

OTHER PUBLICATIONS

"Silicone Grease," Wikipedia Page, dated by Wayback Machine to Nov. 11, 2020, url:<https://web.archive.org/web/20201111200932/https://en.wikipedia.org/wiki/Silicone_grease>.*

(Continued)

*Primary Examiner* — Vinh Luong

(57) ABSTRACT

Disclosed herein is a threaded bottom bracket comprising: an internal sleeve, a ball bearing, wherein an inner race of the ball bearing is an extended inner race, a cup fit to concentrically hold the ball bearing, wherein the cup is coupled to the internal sleeve, a labyrinth, the labyrinth coupled to the ball bearing and fit to prevent water and debris from entering the ball bearing, wherein the labyrinth and the cup form a path, and a rotary seal disposed between the ball bearing and the labyrinth, the rotary seal having an external seal that seals against the extended inner race.

13 Claims, 15 Drawing Sheets

(56) References Cited

U.S. PATENT DOCUMENTS

| | | | | |
|---|---|---|---|---|
| 8,267,417 | B1* | 9/2012 | Yamanaka | B62M 3/003 |
| | | | | 74/594.1 |
| 8,393,794 | B1* | 3/2013 | Shiraishi | B62K 19/34 |
| | | | | 384/458 |
| 9,517,811 | B1* | 12/2016 | Shiraishi | B62K 19/34 |
| 11,124,258 | B2* | 9/2021 | Hsu | B62M 3/003 |
| 2003/0080511 | A1* | 5/2003 | Oldenburg | F16J 15/324 |
| | | | | 277/371 |
| 2003/0097901 | A1* | 5/2003 | Yamanaka | B25B 15/005 |
| | | | | 74/594.1 |
| 2004/0162172 | A1* | 8/2004 | Yamanaka | B62M 3/003 |
| | | | | 474/160 |
| 2006/0112780 | A1* | 6/2006 | Shiraishi | B62M 3/003 |
| | | | | 74/594.1 |
| 2007/0085276 | A1* | 4/2007 | Hartmann | F16J 15/3264 |
| | | | | 277/349 |
| 2007/0137428 | A1* | 6/2007 | Yamanaka | B62M 3/003 |
| | | | | 74/594.1 |
| 2015/0377299 | A1* | 12/2015 | Varnoux | F16C 33/7886 |
| | | | | 384/479 |
| 2016/0144661 | A1* | 5/2016 | Walthert | B60B 27/026 |
| | | | | 301/124.1 |
| 2023/0025440 | A1* | 1/2023 | Arnault | F16C 33/761 |

OTHER PUBLICATIONS

"List of Desiccants," Wikipedia Page, dated by Wayback Machine to Nov. 11, 2020, url:<https://web.archive.org/web/20201111220246/https://en.wikipedia.org/wiki/List_of_desiccants>.*

"Snap-fit," Wikipedia Page, dated by Wayback Machine to Nov. 11, 2020, url:<https://web.archive.org/web/20201111221423/https://en.wikipedia.org/wiki/Snap-fit>.*

"Silica gel O-ring," Content Page on XST Seals, published Aug. 6, 2019, url:<http://www.sealsmanufacturer.com/info/silica-gel-o-ring-37768372.html>.*

Machine Translation of DE-102016219602-A1.*

Translation of WO-2006029673-A1, Tanke et al., Mar. 23, 2006 (Year: 2006).*

"Rotary Seal Design Guide", Parker Hannifin Corporation, Catalog EPS 5350/USA, 2018.

* cited by examiner

SEAL STRUCTURES

CROSS-REFERENCE TO RELATED APPLICATIONS

This application claims benefit of U.S. Provisional Patent Application Ser. No. 63/215,771, filed Jun. 28, 2021, entitled "SEAL STRUCTURES" by Douglas Alexander Chalmers et al., assigned to the assignee of the present application, which is herein incorporated by reference in its entirety.

This application claims benefit of U.S. Provisional Patent Application Ser. No. 63/218,875, filed Jul. 6, 2021, entitled "DESICCANT LINER" by Douglas Alexander Chalmers et al., assigned to the assignee of the present application, which is herein incorporated by reference in its entirety.

BACKGROUND ART

Bottom bracket assemblies are found on bicycles and are used to hold the drive train, or more specifically the spindle from the bike pedals. The bottom bracket goes directly into the frame of the bike. Due to the low placement of bottom bracket assemblies, it is easy for dirt and debris to enter the bottom bracket and degrade the components and their performance. The present invention aims to mitigate the amount of dirt and debris able to get into the assembly.

BRIEF DESCRIPTION OF THE DRAWINGS

Aspects of the present invention are illustrated by way of example, and not by way of limitation, in the accompanying drawings, wherein.

DETAILED DESCRIPTION OF THE EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

One common issue bottom brackets, and similar structures that utilize ball bearings, face is water and/or debris entering and interfering with the ball bearings. More specifically, in bearing assemblies keeping water, dirt, and debris out of the bearing assembly is a key part of avoiding corrosion or degradation of the assembly and its abilities.

Aspects of the invention will be discussed in regards to a bottom bracket that might go around a crank set of a bike, however it should be understood that the invention is not limited to bikes and may be used in other applications.

Figure 1:
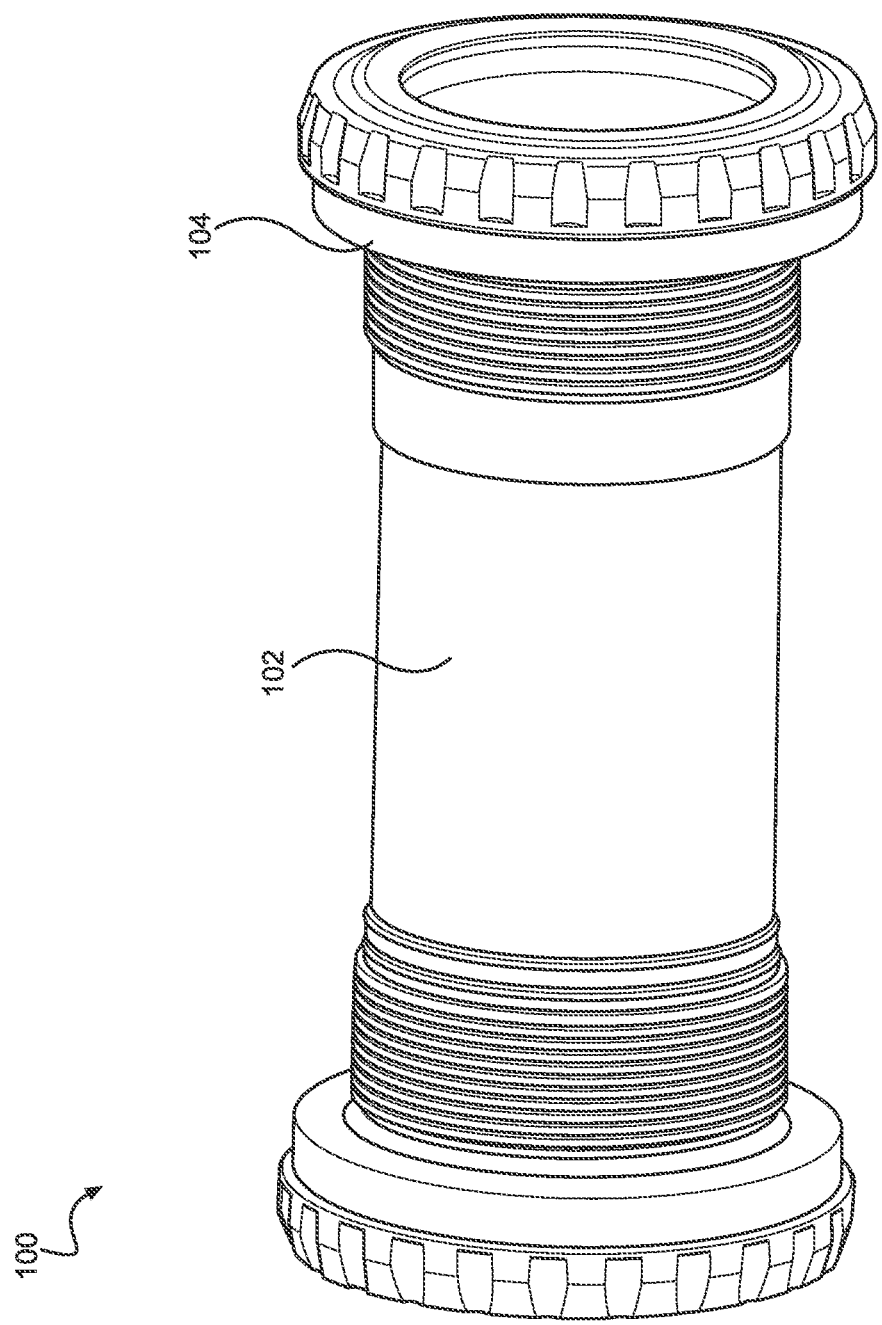
FIG. 1 shows a perspective view of a threaded bottom bracket

FIG. 1 shows a perspective view of a threaded bottom bracket 100. From this view, the internal sleeve 102 and cup 104 can be seen. In one embodiment, internal sleeve 102 is made of a polymer such as, for example, a glass filled nylon. In one embodiment, the cup 104 is made of a metal such as, for example, aluminum.

Figure 2:
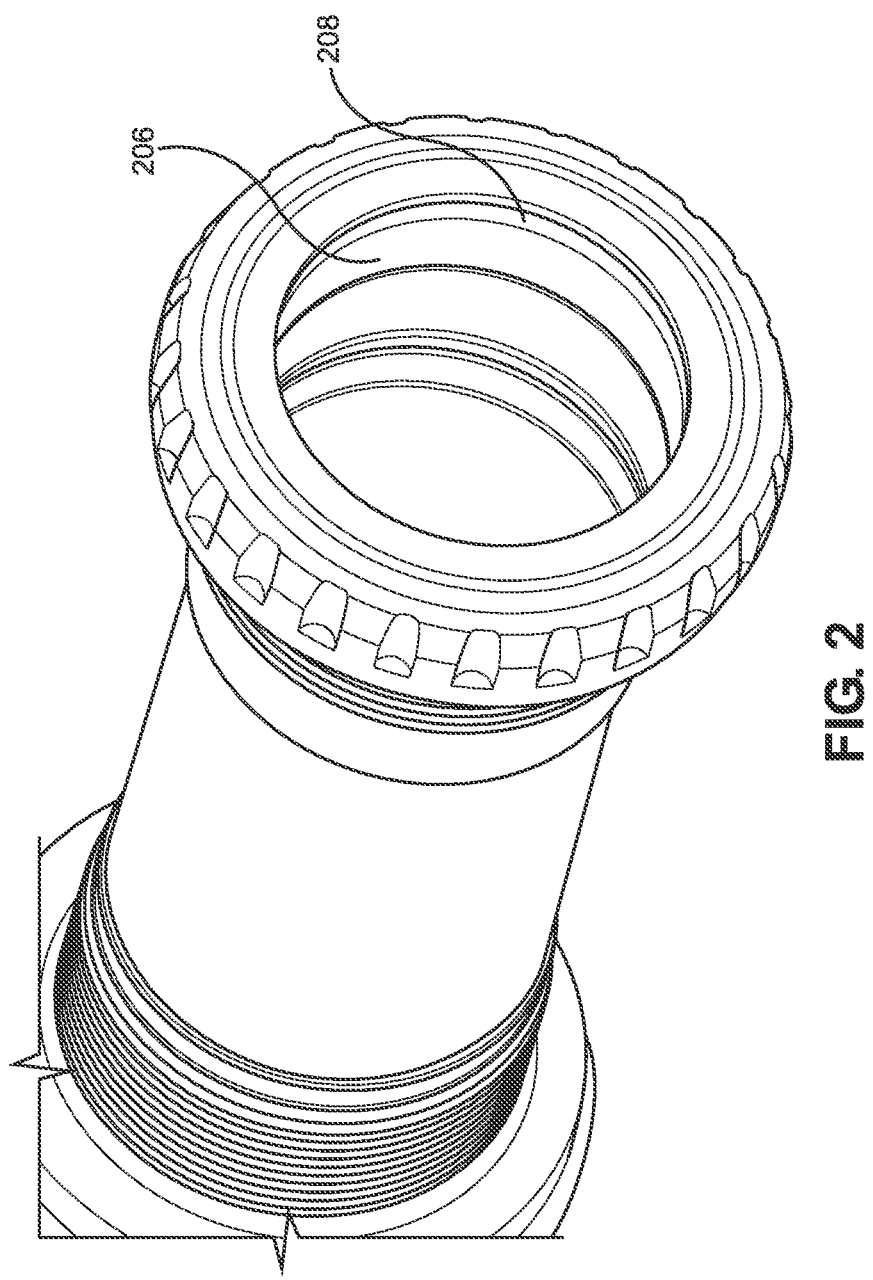
FIG. 2 shows a second perspective of a threaded bottom bracket.

FIG. 2 shows a second perspective of a threaded bottom bracket 100. In this view, ball bearing 206 and labyrinth 208 can be seen.

Figure 3:
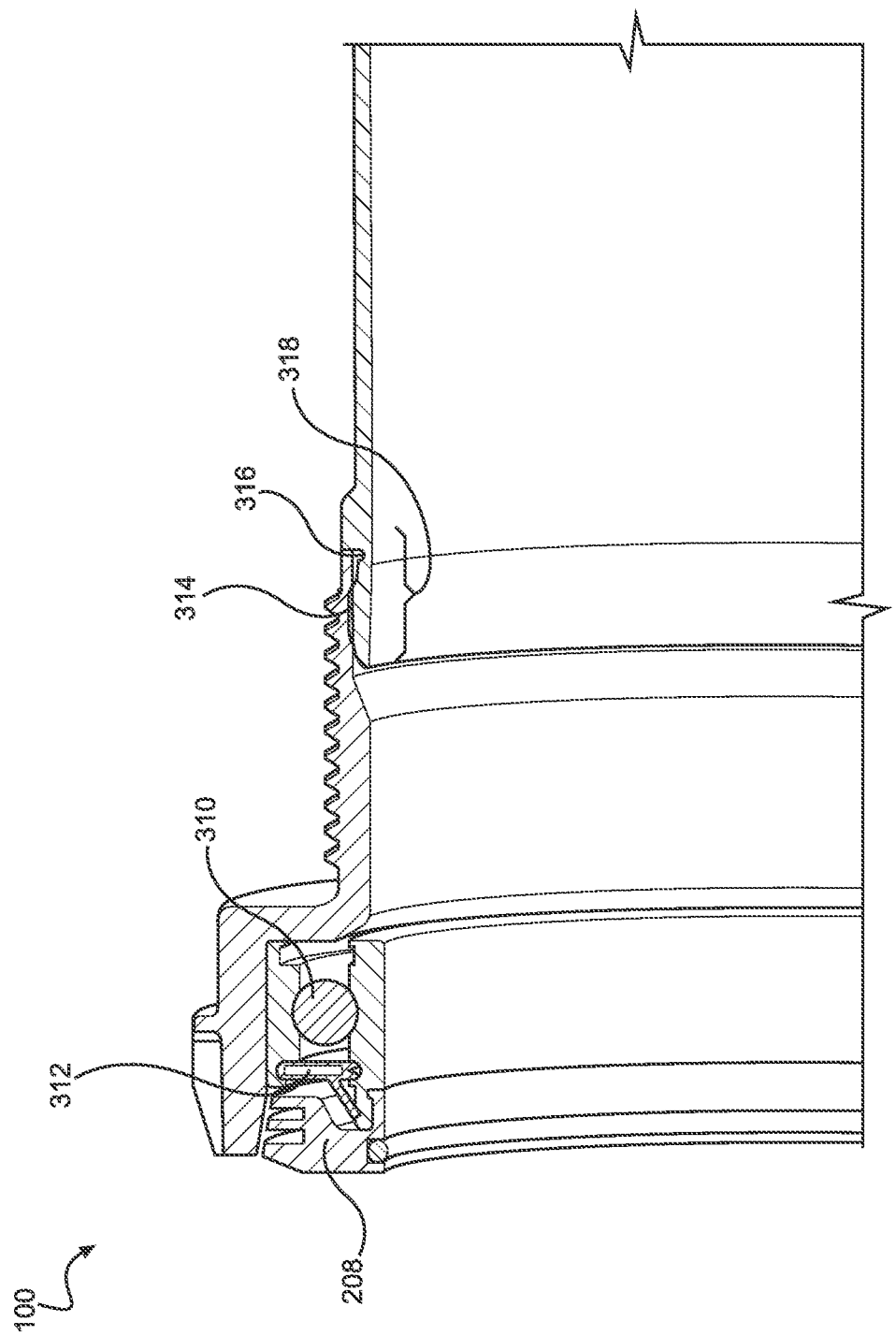
FIG. 3 shows a cutaway view of a first end of a threaded bottom bracket.

FIG. 3 shows a cutaway view of a first end of a threaded bottom bracket 100. In this view, threaded bottom bracket 100 can be seen to have ball bearing 206 with balls 310, a rotary seal 312, labyrinth 208, a connection 314, and a relief 316. In one embodiment, connection 314 is a press fit. In one embodiment, connection 314 has waterproof capabilities.

In one embodiment, connection 314 occurs between internal sleeve 102 and cup 104. In one embodiment, at least a portion of the inner diameter of internal sleeve 102 increases at least one end. This increase of the inner diameter can be seen in at least FIG. 3 and FIG. 4 at lengths 318 and 418 respectively.

Figure 4:
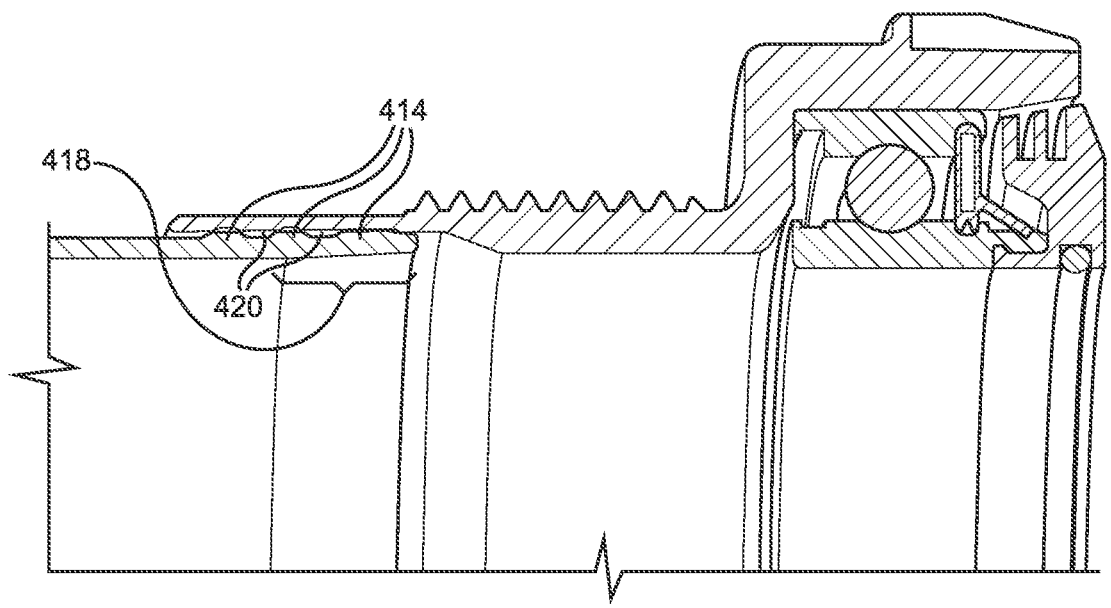
FIG. 4 shows a cutaway view of a second end of a threaded bottom bracket.

FIG. 4 shows a cutaway view of a second end of a threaded bottom bracket 100. In the embodiment shown, the second end of the threaded bottom bracket 100 is relatively similar to the first end, with one main difference being connection 414 and grease channel 420. In one embodiment, grease channel 414 is filled with grease. In one embodiment, connection 414 is a press fit. In one embodiment, connection 414 has waterproof capabilities.

In one embodiment, relief 316 is filled with grease. In one embodiment, such as the one shown in FIG. 4, connection 414 takes the form of multiple ridges instead of the single section 314 in FIG. 3. While FIG. 3 and FIG. 4 are explained to be two asymmetrical ends of threaded bottom bracket 100, it should be understood that threaded bottom bracket 100 may be symmetrical in other embodiments.

Figure 5:
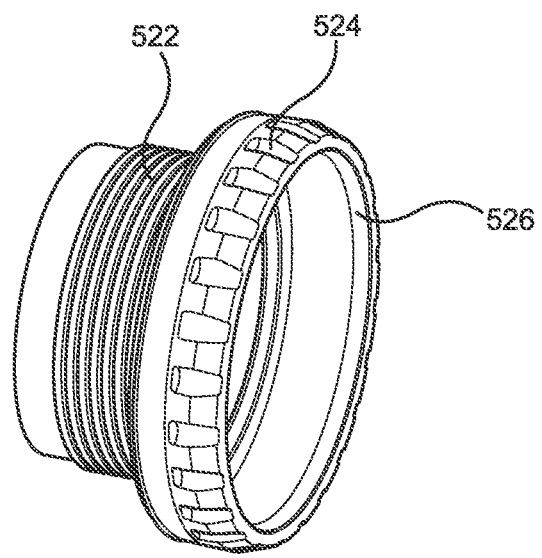
FIG. 5 shows a perspective view of a cup.

FIG. 5 shows a perspective view of a cup 104. Cup 104 includes a threaded portion 522 and notched interface 524. In one embodiment, notched interface 524 may engage with tools for adjustment of the assembly. In one embodiment, a back section of the cup 104 may be thinned to accommodate the internal sleeve 102, as seen in at least FIG. 4. In one embodiment, there is a chamfer 526 in the opening of the cup 104 to accommodate for the ball bearing 206 and labyrinth 208 components.

Figure 6:
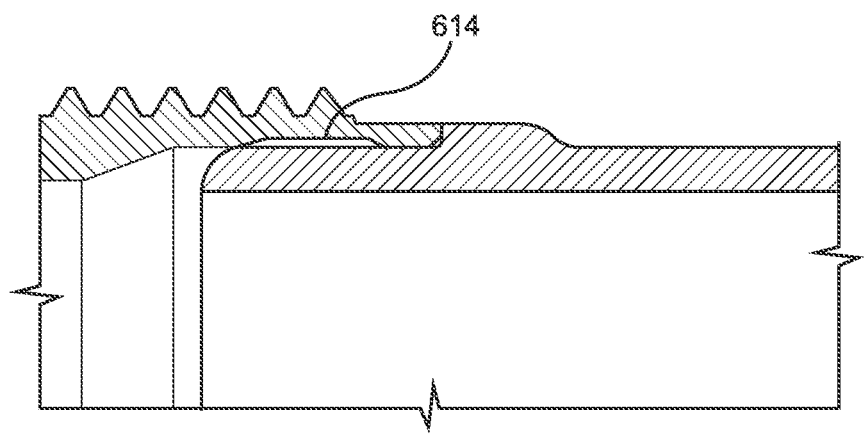
FIG. 6 shows a close-up view of an alternate embodiment of the connection between the internal sleeve and the cup.

FIG. 6 shows a close-up view of an alternate embodiment of the connection 614 between the internal sleeve 102 and the cup 104. In one embodiment, connection 614 is a press fit where the internal sleeve 102 deforms. In one embodiment, connection 614 is a permanent connection. In this embodiment, grease may also be used to further the waterproof abilities of the connection 614.

Figure 7:
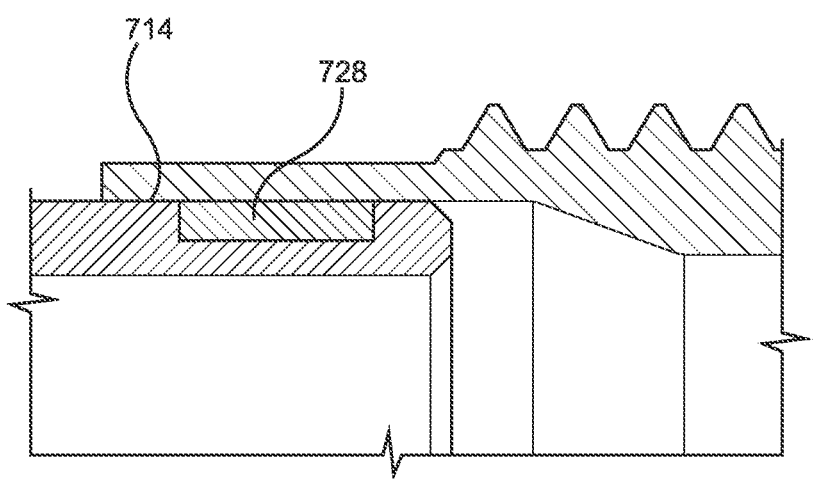
FIG. 7 shows a close-up view of an alternate embodiment of the connection between the internal sleeve and the cup.

FIG. 7 shows a close-up view of an alternate embodiment of the connection 714 between the internal sleeve 102 and the cup 104. In this embodiment, a square O-ring 728 is utilized. In this embodiment, connection 714 is capable of telescopic translation to accommodate for width tolerance.

Figure 8:
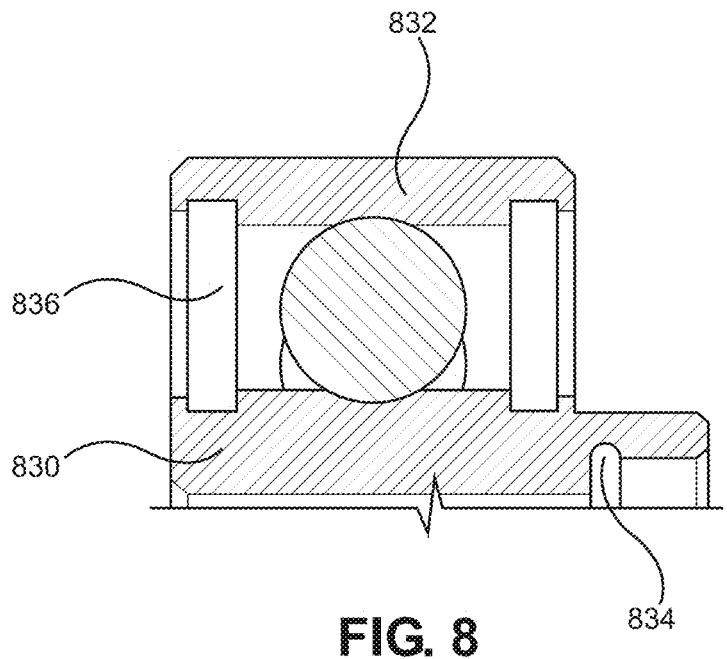
FIG. 8 shows a cross sectional view through the axis of ball bearing.

FIG. 8 shows a cross sectional view through the axis of ball bearing 206. Ball bearing 206 may also be referred to as a cartage type bearing 206. As shown in previous figures, ball bearing 206 may be fit into cup 104. Ball 310 can be seen in the ball bearing 206, as well as extended inner race 830, outer race 832, labyrinth connection relief 834, and a second seal slot 836 (second seal not shown). The second seal works similar to rotary seal 312, but lacks an external seal 938 (FIG. 9) that is found on the rotary seal 312.

In one embodiment, the inner diameter of extended inner race 830 is 30 mm, the outer diameter of outer race 832 is 40 mm, the width of outer race 832 is 6 mm, and the width of the extended portion of extended inner race 830 is 2 mm. These measurements are not intended to be limiting, rather are meant to give an idea of the relative proportions used in this embodiment.

In one embodiment, the components of ball bearing 206 are all made of the same material. In one embodiment, the components of ball bearing 206 are made of a high carbon chromium steel. In one embodiment, balls 310 are slightly harder than extended inner race 830 and outer race 832.

Figure 9:
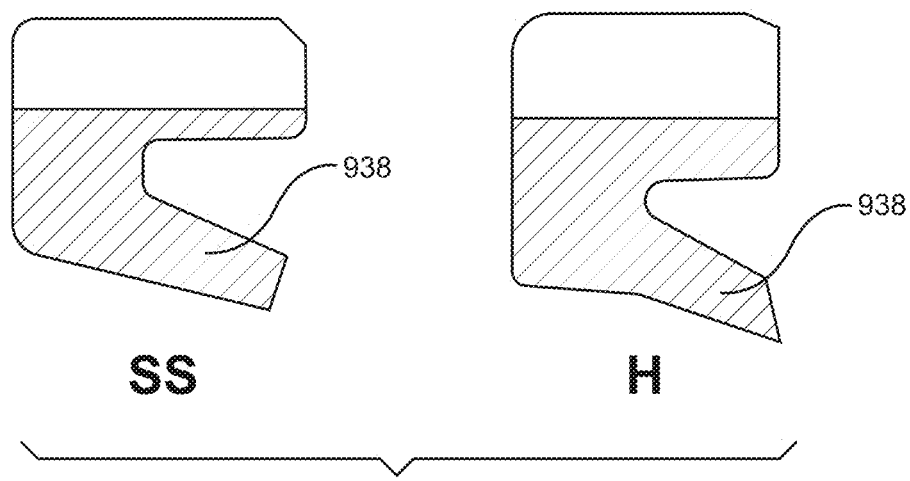
FIG. 9 shows a cross sectional view through the axis of alternate designs for rotary seal.

FIG. 9 shows a cross sectional view through the axis of alternate designs for rotary seal 312. In both designs SS and H, an external seal 938 is present that would seal against extended inner race 830. In one embodiment, rotary seal 312 is made out of nitrile butadiene rubber.

The primary function of the external seal 938, or wiper lip, is to contain the grease within the ball bearing, and a secondary function is to prevent contaminants from entering the ball bearing. Higher external pressures will increase the sealing ability.

Over time, it is possible for the extended inner race 830 of the ball bearing to translate with use. With the design of the rotary seal SS and H, the seal will be maintained despite any translation of the extended inner race 830.

Figure 10:
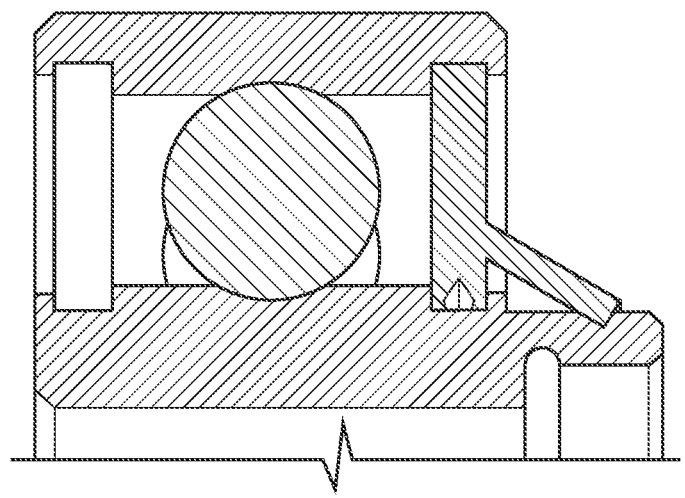
FIG. 10 shows the placement of rotary seal coupled to ball bearing.

FIG. 10 shows the placement of rotary seal 312 coupled to ball bearing 206.

Either design for the rotary seal 312 would have the advantages of consistent sealing regardless of any preload on the ball bearing, being closer to the normal axis and being less sensitive to misalignment, and having a small sealing diameter which leads to less drag.

Figure 11:
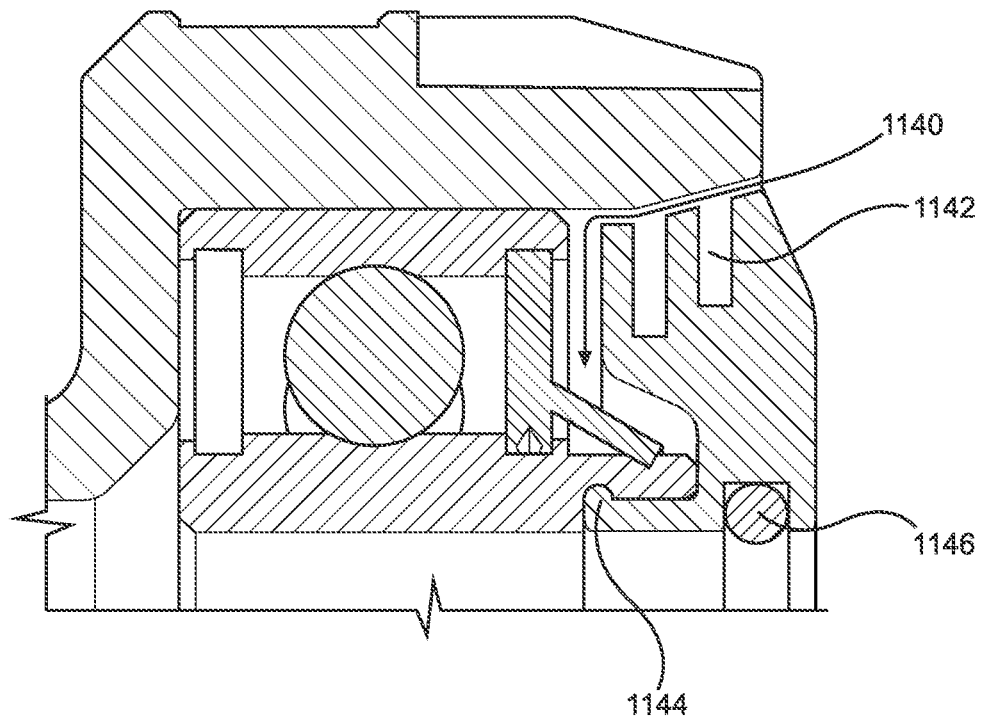
FIG. 11 shows a cutaway view of the design for labyrinth connected to ball bearing.

FIG. 11 shows a cutaway view of the design for labyrinth 208 connected to ball bearing 206. Labyrinth 208 is a component that assists in sealing, and prevention of water and/or debris from entering ball bearing 206. Labyrinth 208 has the advantage of not adding extra drag to the system, due to being non-contact, but creating a more arduous path for potential contaminates to work through.

Path 1140 is formed by both cup 104 and labyrinth 208. When entering path 1140, water and/or debris may fall into the debris channels 1142. Water and/or debris falling into the debris channels 1142 may be due to their size/weight, or due to the fluid dynamic properties that the debris channels create, which lowers the kinetic energy of the fluid and contaminates. As the system rotates, the water and/or debris would be forced towards cup 104, and would be pushed back out of path 1140 due to the slope of chamfer 526. Any water and/or debris that get past debris channels 1142 would then be met by rotary seal 312 and its external seal 938. By the time fluid and contaminates reach external seal 938, the kinetic energy should be so low such that it would not get past the seal. In one embodiment, the seal created by the labyrinth 208 and external seal 938 is not affected by any preload on the ball bearing 206.

Figure 22:
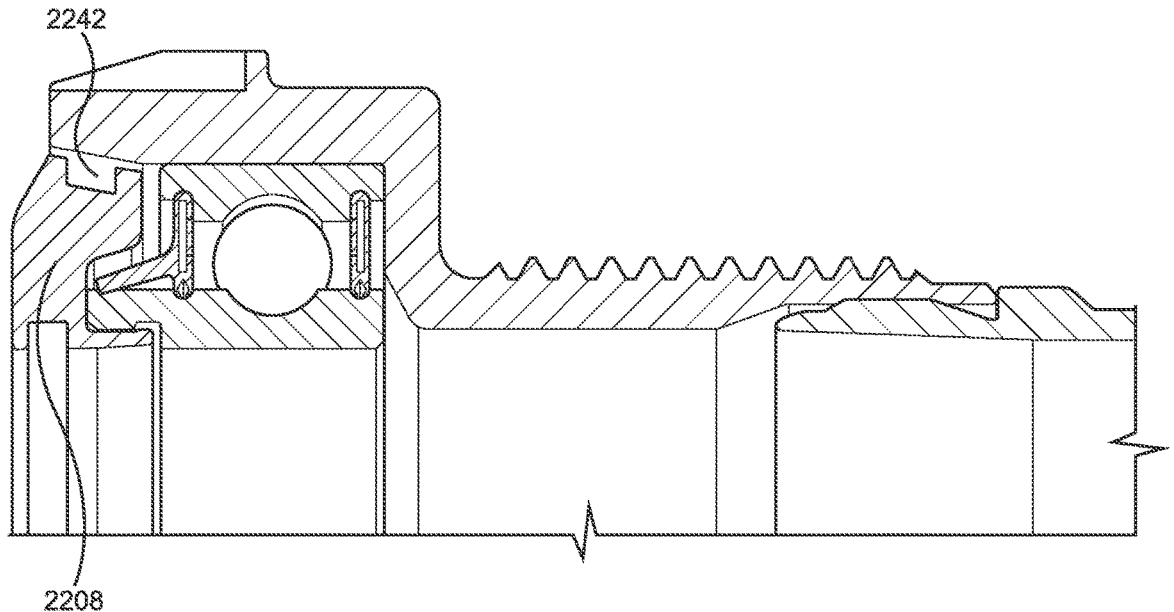
FIG. 22 shows a cutaway view of a first end of a threaded bottom bracket with an alternate labyrinth.

In one embodiment, there are multiple debris channels 1142 in the labyrinth 208 as shown in at least FIG. 11. FIG. 22 shows a cutaway view of a first end of a threaded bottom bracket 100 with an alternate labyrinth 2208. In this embodiment, labyrinth 2208 has a singular debris channel 2242.

Labyrinth 208 also has snap fit 1144 which may couple with the labyrinth connection relief 834 of ball bearing 206. Labyrinth O-ring 1146 is also present to seal the inner side of the assembly. In one embodiment, labyrinth 208 may rotate while labyrinth O-ring 1146 remains stationary.

Figure 12:
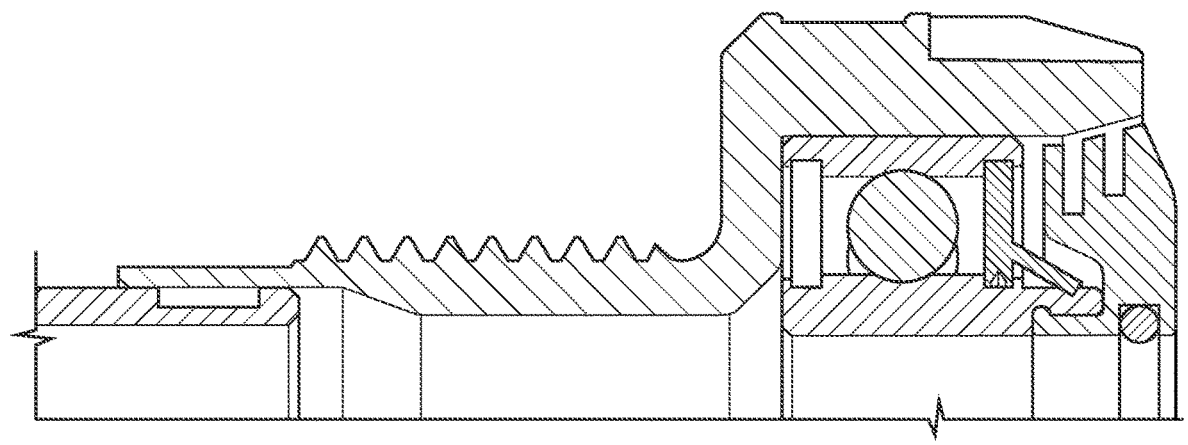
FIG. 12 shows an axial cutaway view of the threaded bottom bracket assembly.

FIG. 12 shows an axial cutaway view of the threaded bottom bracket 100 assembly.

In one embodiment, a desiccant is added to the internal surface of internal sleeve 102.

In one embodiment, a desiccant is added to the internal surface of cup 104.

In one embodiment the desiccant is a liner. In one embodiment the desiccant is a capsule placed in a recess or attached to an inner surface. In one embodiment the desiccant is attached via bolts, snap fit, and other similar methods. In one embodiment the desiccant is a liner with an adhesive side for securement. In one embodiment, the desiccant is easily removable and replaceable. In one embodiment, the desiccant can be removed and treated such that it may be reused (e.g. heated).

Figure 13:
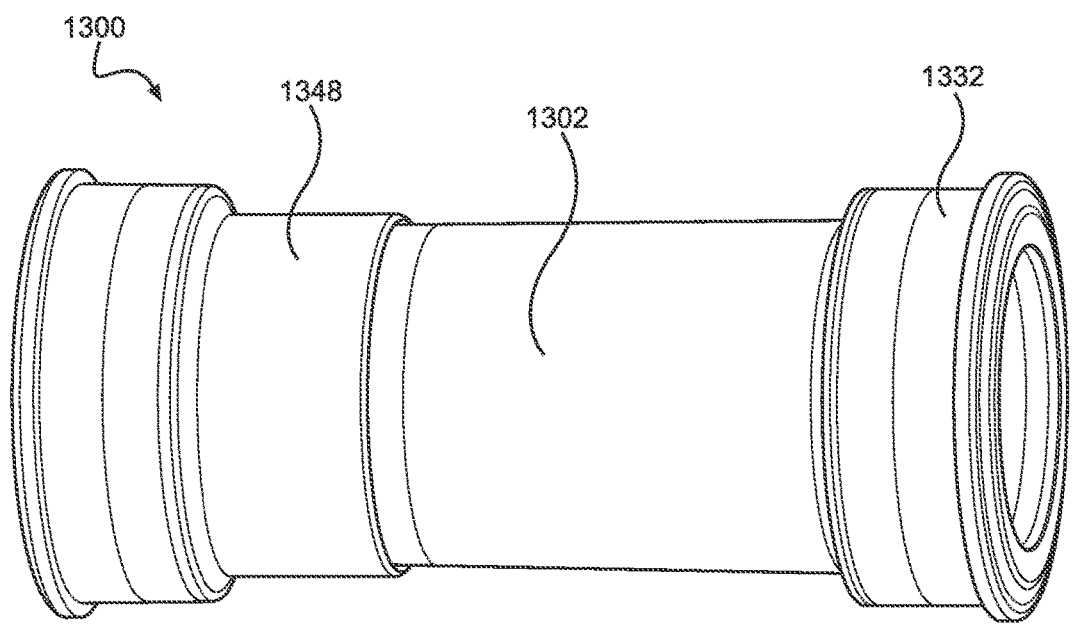
FIG. 13 shows a perspective view of a bottom bracket.

In one embodiment, cup 104 is integrated with other components. FIG. 13 shows a perspective view of a bottom bracket 1300. From this view, external sleeve 1348, sleeve 1302, and outer race 1332 can be seen. In one embodiment, sleeve 1302 is made of a polymer such as, for example, a glass filled nylon.

In the application of a bike, this embodiment may be pressed directly into the frame.

Figure 14:
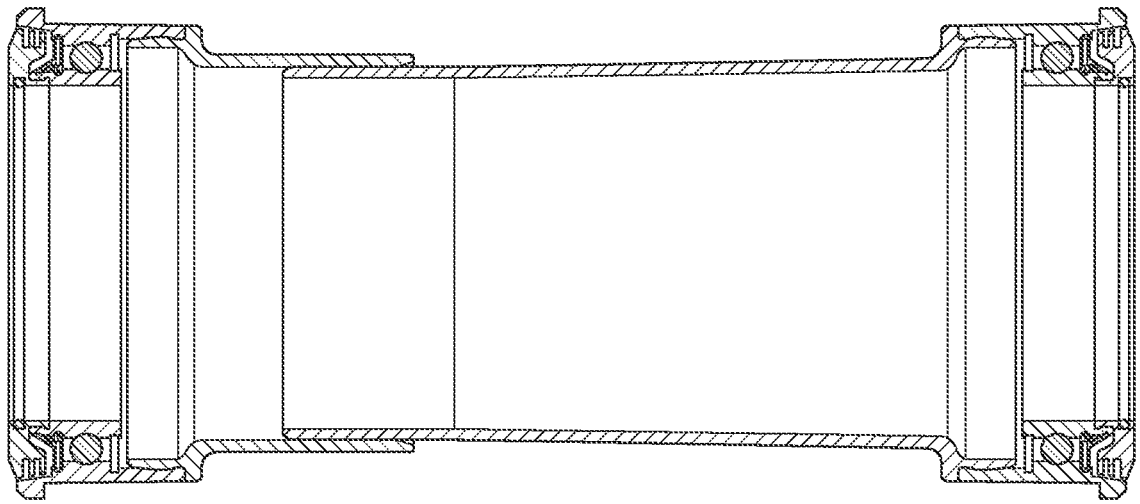
FIG. 14 shows a cutaway view of bottom bracket.

FIG. 14 shows a cutaway view of bottom bracket 1300. In this view, sleeve 1302 can be seen to concentrically engage with external sleeve 1348.

Figure 15:
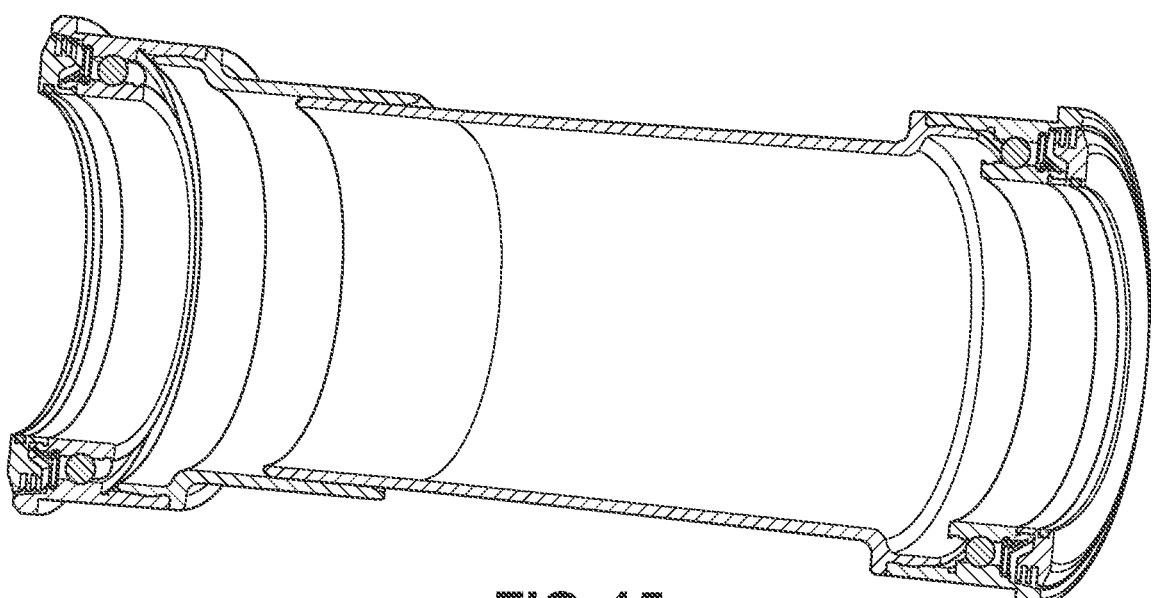
FIG. 15 shows a perspective cutaway view of bottom bracket.

FIG. 15 shows a perspective cutaway view of bottom bracket 1300.

Figure 16:
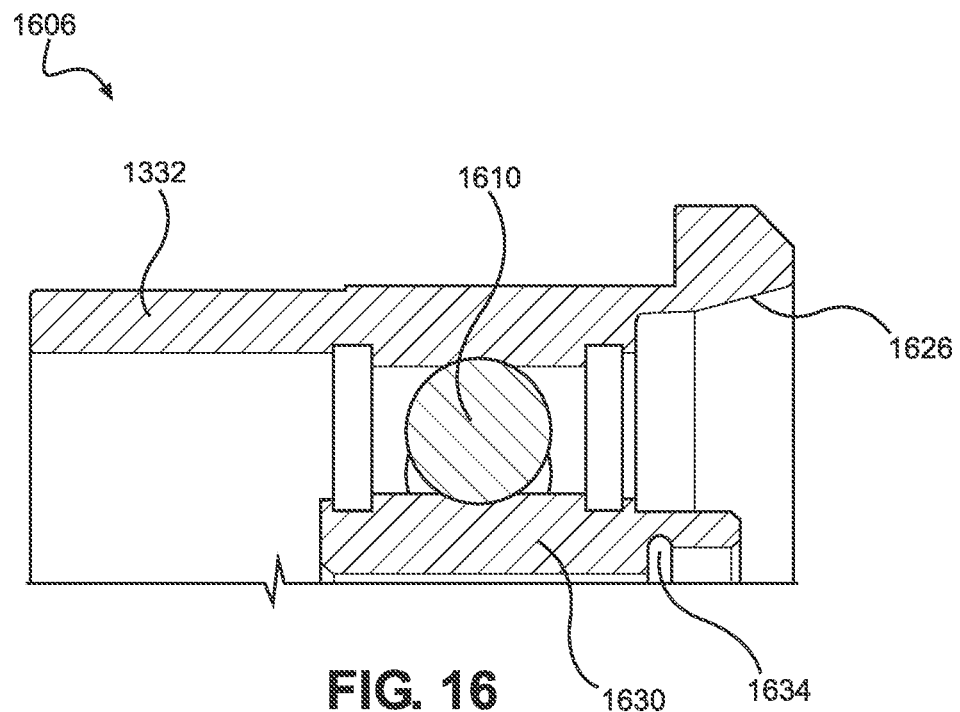
FIG. 16 shows a cross sectional view through the axis of ball bearing.

FIG. 16 shows a cross sectional view through the axis of ball bearing 1606. Ball bearing 1606 is composed of outer race 1332, inner race 1630, and balls 1610. Similar to previous embodiments, labyrinth connection relief 1634 is part of inner race 1630.

In this embodiment, as the cup 104 of the previous embodiment is integrated into other components, slope 1626 is now part of outer race 1332.

In one embodiment, the inner diameter of inner race 130 is 30 mm, the outer diameter of outer race 1332 is 41 mm, the width of outer race 1332 is 6 mm, and the width of the extended portion of inner race 1630 is 2 mm. These measurements are not intended to be limiting, rather are meant to give an idea of the relative proportions used in this embodiment.

In one embodiment, the components of ball bearing 1606 are all made of the same material. In one embodiment, the components of ball bearing 1606 are made of a high carbon chromium steel. In one embodiment, balls 1610 are slightly harder than extended inner race 1630 and outer race 1332.

Figure 17:
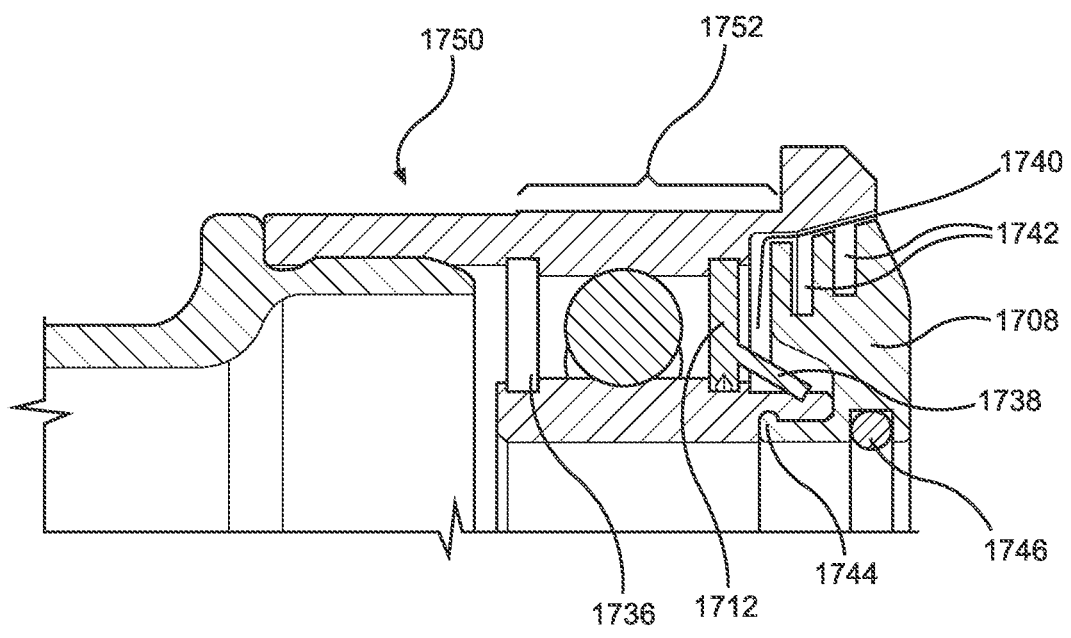
FIG. 17 shows a cross sectional view of ball bearing, labyrinth, rotary seal, and external sleeve.

FIG. 17 is a cross sectional view of ball bearing 1606, labyrinth 1708, rotary seal 1712, and external sleeve 1348. The previous discussion of FIG. 9 and rotary seal 312 may easily apply to rotary seal 1712, as no significant structural changes are made.

Labyrinth 1708 is a component that assists in sealing, and prevention of water and/or debris from entering ball bearing 1606. Labyrinth 1708 has the advantage of not adding extra drag to the system, due to being non-contact, but creating a more arduous path for potential water and/or debris to work through.

In the bottom bracket 1300 embodiment, path 1740 is formed by both outer race 1332 and labyrinth 1708. When entering path 1740, water and/or debris may fall into the debris channels 1742. Water and/or debris falling into the debris channels 1742 may be due to their size/weight, or due to the fluid dynamic properties that the debris channels create, which lowers the kinetic energy of the fluid and contaminates. As the system rotates, the water and/or debris would be forced towards outer race 1332, and would be pushed back out of path 1740 due to slope 1626. Any water and/or debris that get past debris channels 1742 would then be met by rotary seal 1712 and its external seal 1738. By the time fluid and contaminates reach external seal 1738, the kinetic energy should be so low such that it would not get past the seal. In one embodiment, the seal created by the labyrinth 1708 and external seal 1738 is not affected by any preload on the ball bearing 1606.

Figure 23:
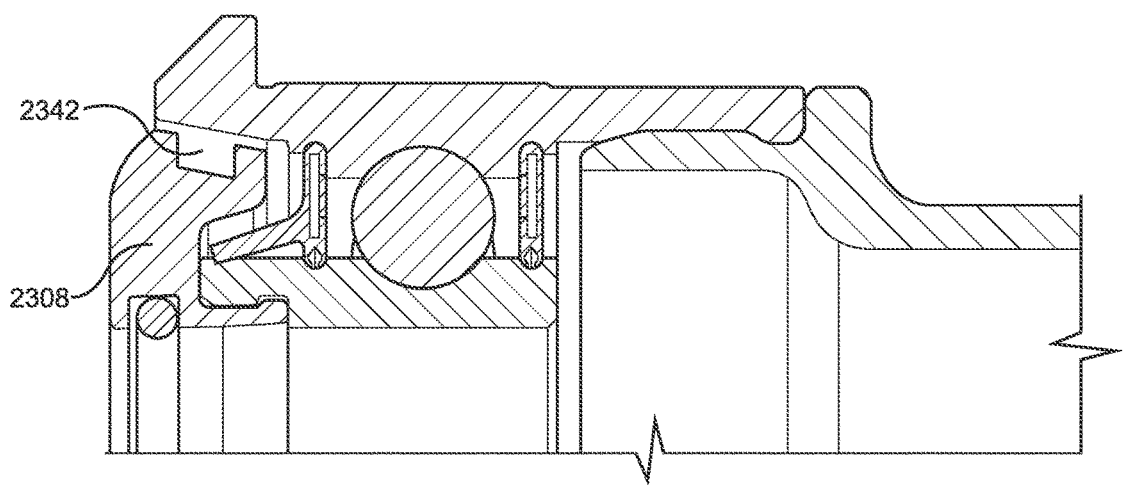
FIG. 23 shows a cutaway view of a first end of a bottom bracket with an alternate labyrinth.

In one embodiment, there are multiple debris channels 1742 in the labyrinth 1708 as shown in at least FIG. 13. FIG. 23 shows a cutaway view of a first end of a bottom bracket 1300 with an alternate labyrinth 2308. In this embodiment, labyrinth 2308 has a singular debris channel 2342.

Labyrinth 1708 also has snap fit 1744 which may couple with the labyrinth connection relief 1634 of ball bearing 1606. Labyrinth O-ring 1746 is also present to seal the inner side of the assembly. In one embodiment, labyrinth 1608 may rotate while labyrinth O-ring 1746 remains stationary.

FIG. 17 also shows lead in portion 1750 between outer race 1332 and external sleeve 1348. The lead in 1750 is used to center the part and locate the external sleeve 1348 or sleeve 1302. The press fit portion 1752 is a slightly larger diameter than lead in portion 1750. This also helps with easier installation of the part, as there is not as much interference to overcome. A second seal slot 1736 (second seal not shown) is also present to hold a seal on the other side of balls 1610. The second seal works similar to rotary seal 1712, but lacks an external seal 1738 that is found on the rotary seal 1712.

Figure 18:
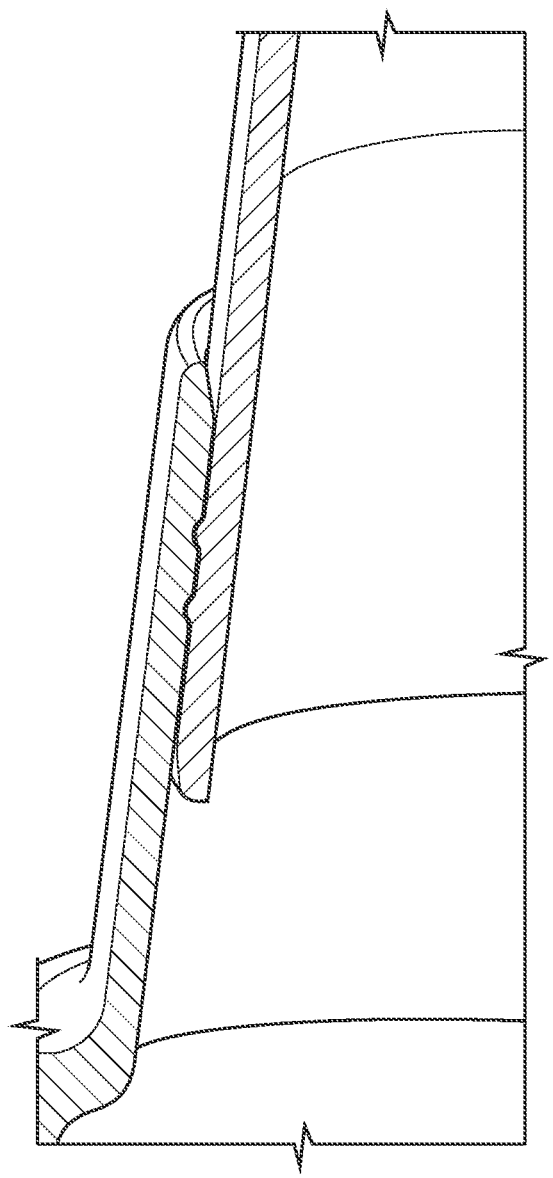
FIG. 18 shows a close-up cross-sectional view of the connection between external sleeve and sleeve.

FIG. 18 shows a close-up cross-sectional view of the connection between external sleeve 1348 and sleeve 1302. In one embodiment this connection is a press fit connection.

In one embodiment, there is a grease channel between ridges of the press fit connection, similar to those of at least FIG. 4.

Figure 19:
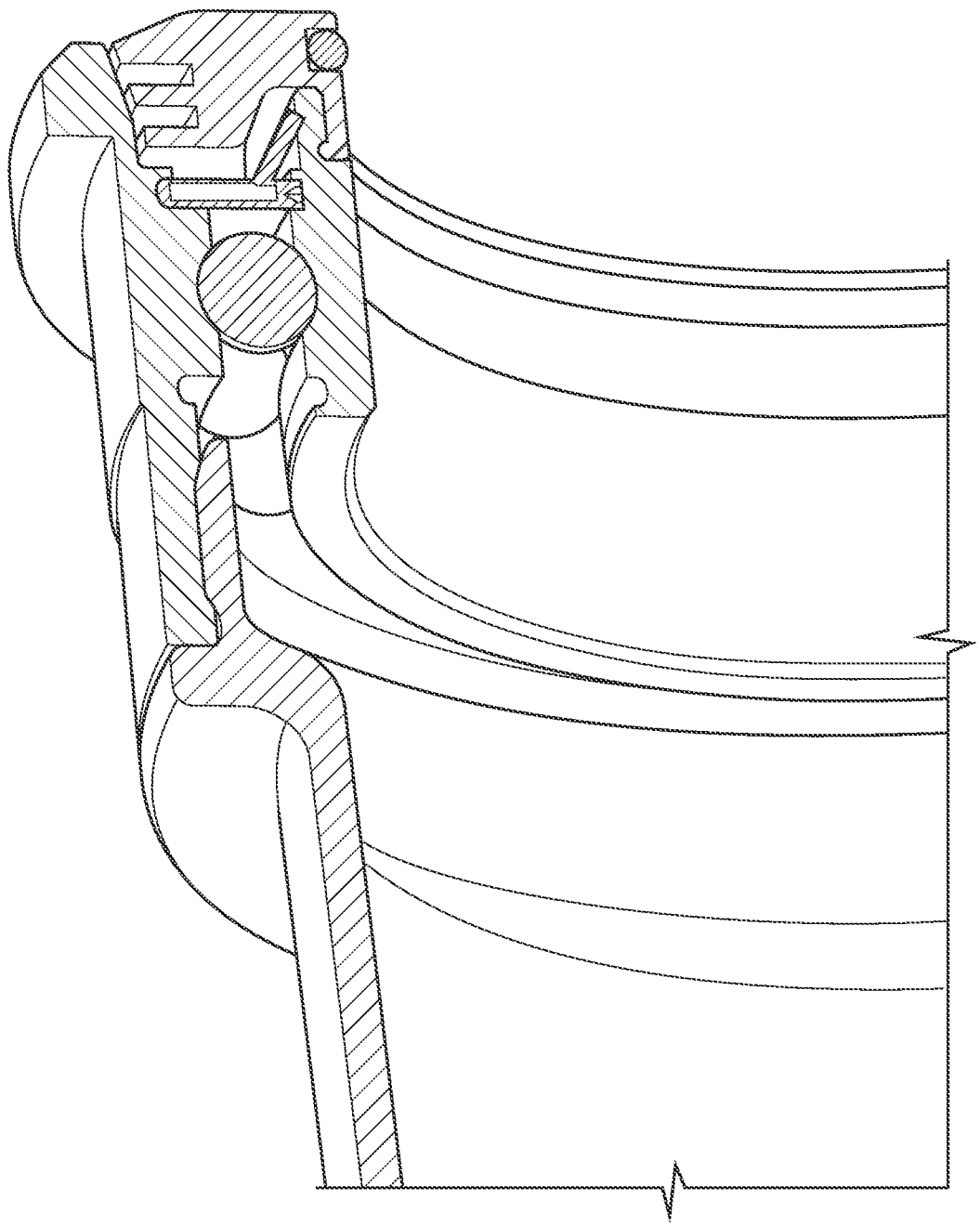
FIG. 19 shows a perspective cross section view of bottom bracket.

FIG. 19 shows a perspective cross section view of bottom bracket 1300. In this view, multiple balls 1610 can be seen, as well as the full circular nature of some of the key parts such as labyrinth 1708.

Figure 20:
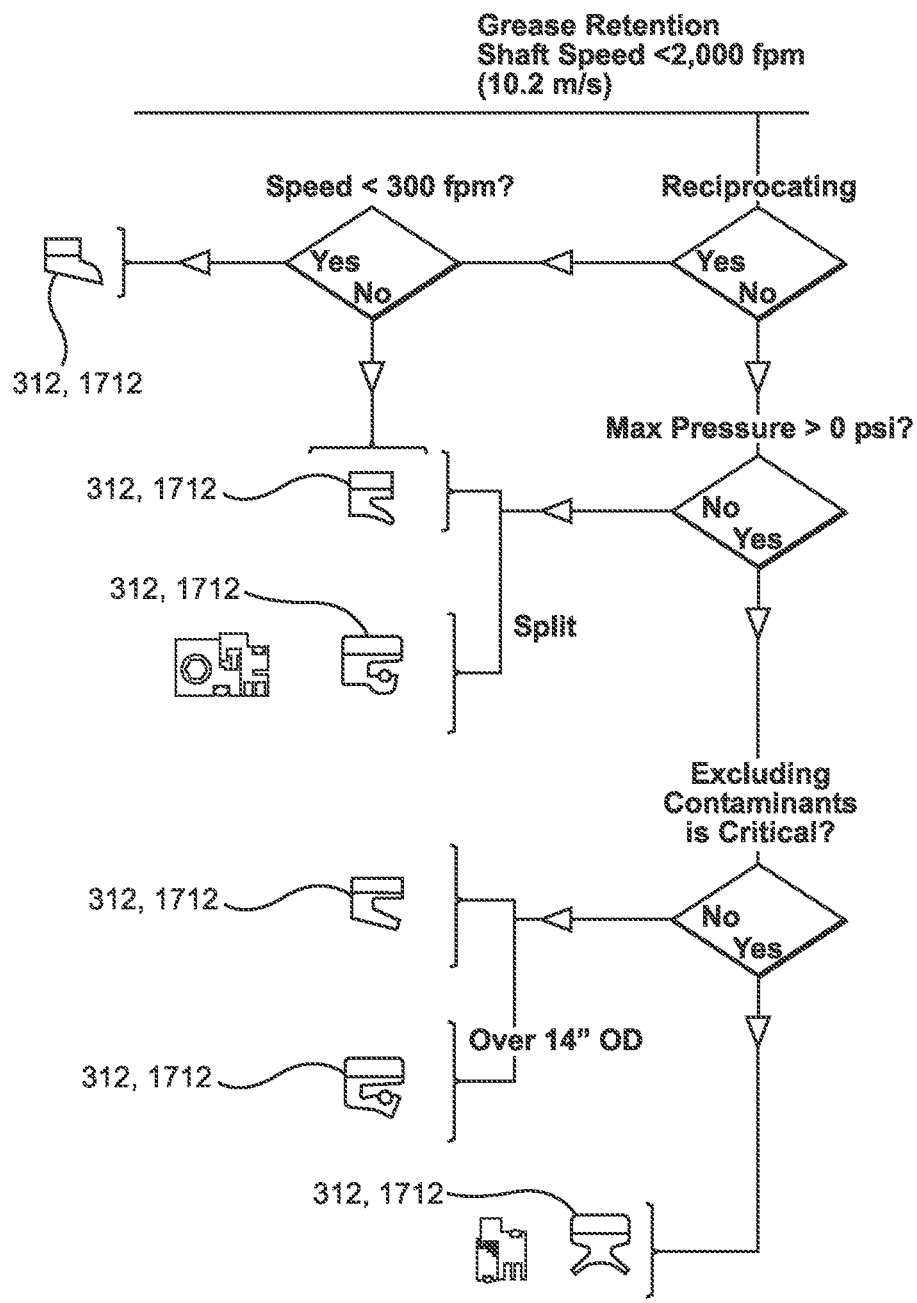
FIG. 20 shows a flow diagram of which rotary seal shape should be used.

FIG. 20 shows a flow diagram of which rotary seal 312, 1712 shape should be used. Alternate seal designs from those shown in at least FIG. 9 are also shown. It should be understood that the decision process of FIG. 20 is not meant to be limiting, but rather show a potential logic process behind the shape of rotary seal 312, 1712.

Figure 21:
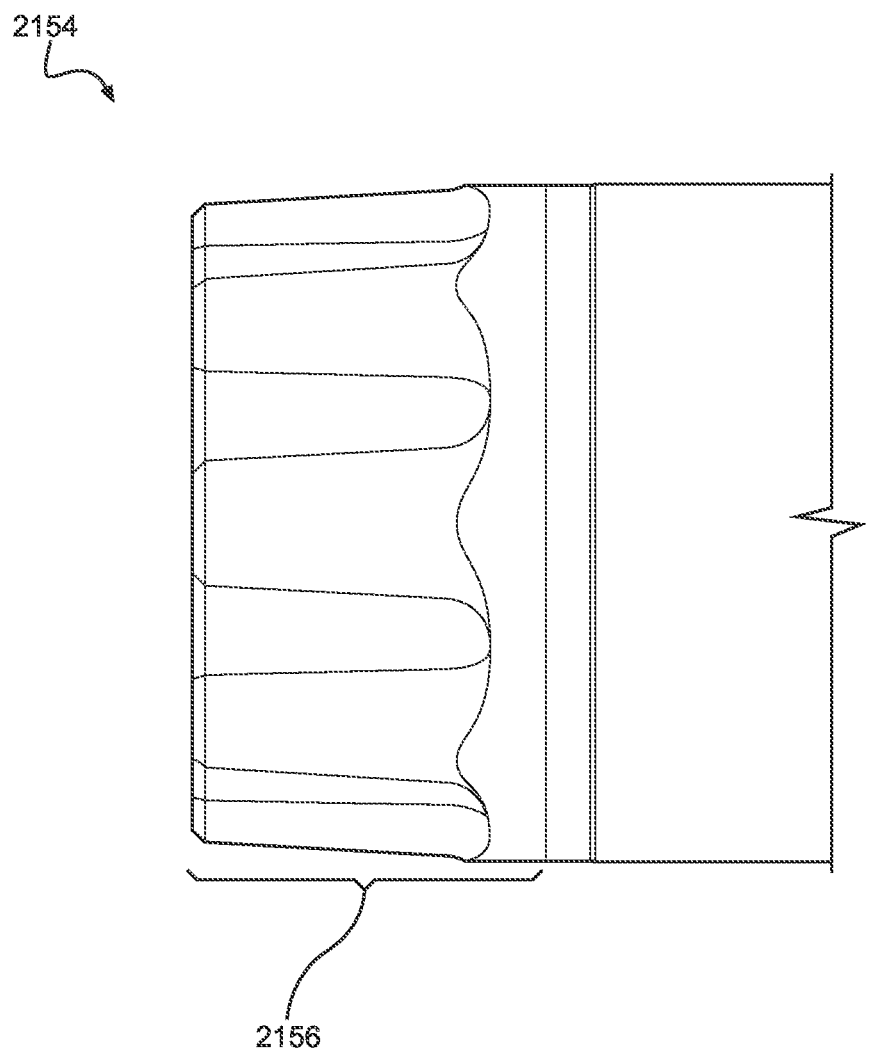
FIG. 21 shows an example of a spindle that might be inserted through bottom bracket or threaded bottom bracket.

FIG. 21 shows an example of a spindle 2154 that might be inserted through bottom bracket 1300 or threaded bottom bracket 100. In one embodiment, the spindle 2154 has a lead in 2156 to accommodate for labyrinth O-ring 1146, 1746.

In one embodiment, a desiccant is added to the internal surface of sleeve 1302.

In one embodiment, a desiccant is added to the internal surface of external sleeve 1348.

In one embodiment the desiccant is a liner. In one embodiment the desiccant is a capsule placed in a recess or attached to an inner surface. In one embodiment the desiccant is attached via bolts, snap fit, and other similar methods. In one embodiment the desiccant is a liner with an adhesive side for securement. In one embodiment, the desiccant is easily removable and replaceable. In one embodiment, the desiccant can be removed and treated such that it may be reused (e.g. heated).

In one embodiment, there are approximately 22 balls in the ball bearing. This number may vary, where the load bearing capabilities have a positive correlation with the number of balls. In one embodiment, deep groove ball bearings are used.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:
1. A threaded bottom bracket comprising:
an internal sleeve;
a ball bearing, wherein an inner race of the ball bearing is an extended inner race;
a cup fit to concentrically hold the ball bearing, wherein the cup is coupled to the internal sleeve;
a labyrinth, the labyrinth coupled to the ball bearing and fit to prevent water and debris from entering the ball bearing, wherein the labyrinth and the cup form a path;
a plurality of debris channels disposed within said path; and a rotary seal disposed between the ball bearing and the labyrinth, the rotary seal having an external seal that seals against the extended inner race, wherein, as said labyrinth rotates, water and debris in said path are forced towards said cup and pushed out of said path due to a slope of a chamfer proximate an opening of said cup.

2. The threaded bottom bracket of claim 1 wherein, a connection between the internal sleeve and the cup is a press fit connection.

3. The threaded bottom bracket of claim 1 wherein, the internal sleeve has a grease channel at the connection between the internal sleeve and the cup.

4. The threaded bottom bracket of claim 1 wherein, the cup has threads on an external surface.

5. The threaded bottom bracket of claim 1 wherein, the labyrinth couples to the ball bearing via a snap fit connection.

6. A bottom bracket comprising:
a sleeve;
an external sleeve telescopically coupled to the sleeve;
a ball bearing comprising an inner race and an outer race;
a labyrinth, the labyrinth coupled to the ball bearing and fit to prevent water and debris from entering the ball bearing, said labyrinth comprising a portion of a path;
a plurality of debris channels disposed within said path; and
a rotary seal disposed between the ball bearing and the labyrinth, the rotary seal having an external seal that seals against the inner race, wherein, as said labyrinth rotates, water and debris in said path are forced away from said ball bearing and out of said path due to a slope of a chamfer in said outer race.

7. The bottom bracket of claim 6 wherein, the external sleeve and the sleeve are coupled with a press fit.

8. The bottom bracket of claim 6 wherein, the outer race is coupled to the external sleeve with a press fit.

9. The bottom bracket of claim 6 wherein, the outer race is connected to the sleeve with a press fit.

10. The bottom bracket of claim 6 wherein, the sleeve has a grease channel at the connection between the sleeve and the external sleeve.

11. The bottom bracket of claim 6 wherein, the labyrinth couples to the ball bearing via a snap fit connection.

12. A bicycle comprising:
a bike frame; and
a drive train, wherein the drive train is coupled to a threaded bottom bracket, wherein the threaded bottom bracket comprises:
an internal sleeve;
a ball bearing, wherein an inner race of the ball bearing is an extended inner race;
a cup fit to concentrically hold the ball bearing, wherein the cup is coupled to the internal sleeve;
a labyrinth, the labyrinth coupled to the ball bearing and fit to prevent water and debris from entering the ball bearing, wherein the labyrinth and the cup form a path;
a plurality of debris channels disposed within said path; and
a rotary seal disposed between the ball bearing and the labyrinth, the rotary seal having an external seal that seals against the extended inner race, wherein, as said labyrinth rotates, water and debris in said path are forced towards said cup and pushed out of said path due to a slope of a chamfer proximate an opening of said cup.

13. A bicycle comprising:
a bike frame; and
a drive train, wherein the drive train is coupled to a bottom bracket, wherein the bottom bracket comprises:
a sleeve;
an external sleeve telescopically coupled to the sleeve;
a ball bearing comprising an inner race and an outer race;
a labyrinth, the labyrinth coupled to the ball bearing and fit to prevent water and debris from entering the ball bearing, wherein the labyrinth and the outer race form a path;
a plurality of debris channels disposed within said path; and
a rotary seal disposed between the ball bearing and the labyrinth, the rotary seal having an external seal that seals against the inner race, wherein, as said labyrinth rotates, water and debris in said path are forced away from said ball bearing and out of said path due to a slope of a chamfer in said outer race.

* * * * *